United States Patent
Minör et al.

(10) Patent No.: US 7,062,297 B2
(45) Date of Patent: Jun. 13, 2006

(54) METHOD AND SYSTEM FOR ACCESSING A NETWORK USING VOICE RECOGNITION

(75) Inventors: Sten Minör, Lund (SE); Magnus Tillgren, Malmö (SE); Patrik Olsson, Malmö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 514 days.

(21) Appl. No.: 09/908,630

(22) Filed: Jul. 20, 2001

(65) Prior Publication Data

US 2002/0039913 A1    Apr. 4, 2002

(30) Foreign Application Priority Data

Jul. 21, 2000    (GB)    ................................. 0018027.3

(51) Int. Cl.
*H04Q 7/20* (2006.01)
*H04B 7/00* (2006.01)
*H04M 1/38* (2006.01)
*H04M 3/00* (2006.01)
*H04M 1/00* (2006.01)

(52) U.S. Cl. ................ 455/563; 455/456.3; 455/456.5; 455/456.6; 455/550.1; 455/418; 455/515; 455/517

(58) Field of Classification Search ............. 455/414.2, 455/414.3, 415, 440, 553.1, 554.1, 456, 456.1–456.3, 455/42.2, 556.1–556.2, 563–564, 569.1, 455/569.2, 566, 62, 418, 450, 457, 515–517, 455/524–525, 550.1, 456.5, 456.6, 466, 555, 455/552.1, 554.2, 557–558, 560–561; 379/58, 379/59, 60; 370/330, 401, 338, 400, 312–313, 370/328–329, 341, 349, 310.2; 701/29, 24, 701/33; 704/246, 247, 275; 709/202–203, 709/218–219, 221–222, 228–229, 226
See application file for complete search history.

(56) References Cited

U.S. PATENT DOCUMENTS

| 5,301,227 | A | * | 4/1994 | Kamei et al. ............ 379/88.03 |
| 5,884,266 | A | * | 3/1999 | Dvorak .................... 704/270.1 |
| 6,018,748 | A | * | 1/2000 | Smith ...................... 715/501.1 |
| 6,263,216 | B1 | | 7/2001 | Seydoux et al. |

(Continued)

FOREIGN PATENT DOCUMENTS

EP    0854417 A    7/1998

(Continued)

OTHER PUBLICATIONS

Mohan, A. et al.: "Voice enabled request and response for mobile devices supporting WAP protocol"; IEEE 52$^{nd}$ Vehicular Technology Conference, Sep. 28, 2000, pp. 2736-2738, XP002902232.

*Primary Examiner*—William Trost
*Assistant Examiner*—Meless Zewdu
(74) *Attorney, Agent, or Firm*—Potomac Patent Group PLLC

(57) ABSTRACT

A method of accessing a network using a network access application is disclosed. The network has a plurality of locations which have respective location addresses in the network. The method includes defining a plurality of address components, combinations of which forming respective location addresses, assigning reference voice signals to the address components, comparing input voice signals with the reference voice signals and producing a network access address location on the basis of address components associated with matched input and reference voice signals.

21 Claims, 3 Drawing Sheets

U.S. PATENT DOCUMENTS

| | | | |
|---|---|---|---|
| 6,330,244 B1 * | 12/2001 | Swartz et al. | 370/401 |
| 6,389,337 B1 * | 5/2002 | Kolls | 701/29 |
| 6,408,272 B1 * | 6/2002 | White et al. | 704/270.1 |
| 6,418,199 B1 * | 7/2002 | Perrone | 379/88.01 |
| 6,510,210 B1 * | 1/2003 | Baughan | 379/90.01 |
| 2001/0030950 A1 * | 10/2001 | Chen et al. | 370/329 |

FOREIGN PATENT DOCUMENTS

| | | |
|---|---|---|
| EP | 1041779 A2 | 10/2000 |
| GB | 2317070 A | 3/1998 |
| GB | 2 362 017 | 11/2001 |
| JP | 6274194 | 9/1994 |
| JP | 10084425 A | 3/1998 |
| JP | 11184670 | 7/1999 |
| JP | 11249772 | 9/1999 |
| WO | WO00/05708 | 2/2000 |
| WO | WO01/45086 | 6/2001 |
| WO | WO 01/77866 | 10/2001 |

* cited by examiner

METHOD AND SYSTEM FOR ACCESSING A NETWORK USING VOICE RECOGNITION

THe present invention relates to communication systems, and in particular to methods of communicating with a network.

BACKGROUND OF THE PRESENT INVENTION

Access to data networks, for example the internet, is typically achieved using a conventional personal computer (PC) terminal, which has a large high resolution display and relatively high data transmission bandwidth. In order to communicate with the network concerned the user of the PC typically inputs a network address via a keyboard or other input device, such as a mouse. These devices enable long and complex network addresses to be input to the PC relatively easily so that network locations may be accessed.

A recent development in network, and particularly the internet, access is the standardization of a wireless application protocol (WAP), using the so-called "wireless markup language (WML)". The WAP system enables terminals with small displays, limited processing power and low data transmission bandwidth (for example digital mobile telephones and similar devices) to access and control services and content in a network such as the internet. WAP is a layered communications protocol that includes network layers as well as an application environment including a browser (network communication software). WML uses simple syntax and limited vocabulary in order to make it suitable for controlling communications with a network by a user having access to a portable device.

Whilst the ability to use smaller terminals can be a major convenience to a user, it can be inconvenient to access complex network addresses using a relatively simple keypad input device. For example, a mobile telephone has a keypad primarily intended for inputting telephone numbers, and so input of other characters can become complex and tiresome. It has been proposed to overcome this disadvantage by providing voice control of the user interface. In such proposed systems, automatic speech recognition (ASR) systems are used in order to recognise voice inputs and produce the network location address on the basis of the recognition.

However, in order that a portable device with low processing power is able to implement such voice control, the vocabulary that is stored to be recognised will necessarily be small. Therefore it has been proposed that automatic speech recognition (ASR) be carried out by the network itself. However, this requires the opening of a voice channel between the portable device and the network. This has the obvious disadvantage that the voice channel itself may introduce distortion echoes or noise, thereby degrading the recognition performance. Also, the speed of the voice recognition will be severely compromised.

SUMMARY OF THE PRESENT INVENTION

Embodiments of the present invention can therefore provide a system for overcoming these disadvantages. In one particular embodiment, there is provided a method of communicating with a network having a plurality of applications, each of which has a location address on the network, the method comprising:

defining a plurality of address components, respective combinations of which form location addresses;

storing reference voice signals;

associating the stored reference voice signals with respective address components;

receiving input voice signals;

comparing the input voice signals with the reference voice signals;

composing a location address from the address components that are associated with those reference voice signals which match the received input voice signals; and communicating with the network on the basis of the composed location address.

According to another embodiment of the present invention, there is provided a method of controlling a service application in a mobile terminal, the service application being provided at a remote server having a location address in a network, wherein the method includes defining a plurality of address components which can be combined to form respective location addresses, and comparing input voice signals with stored reference voice signals associated with respective address components, thereby composing a location address for supply to the remote server from the mobile terminal.

It is emphasised that the term "comprises"or "comprising" is used in this specification to specify the presence of stated features, integers, steps or components, but does not preclude the addition of one or more further features, integers, steps or components, or groups thereof.

DETAILED DESCRIPTION OF THE PREFERRED EMBODIMENT

Figure 1:
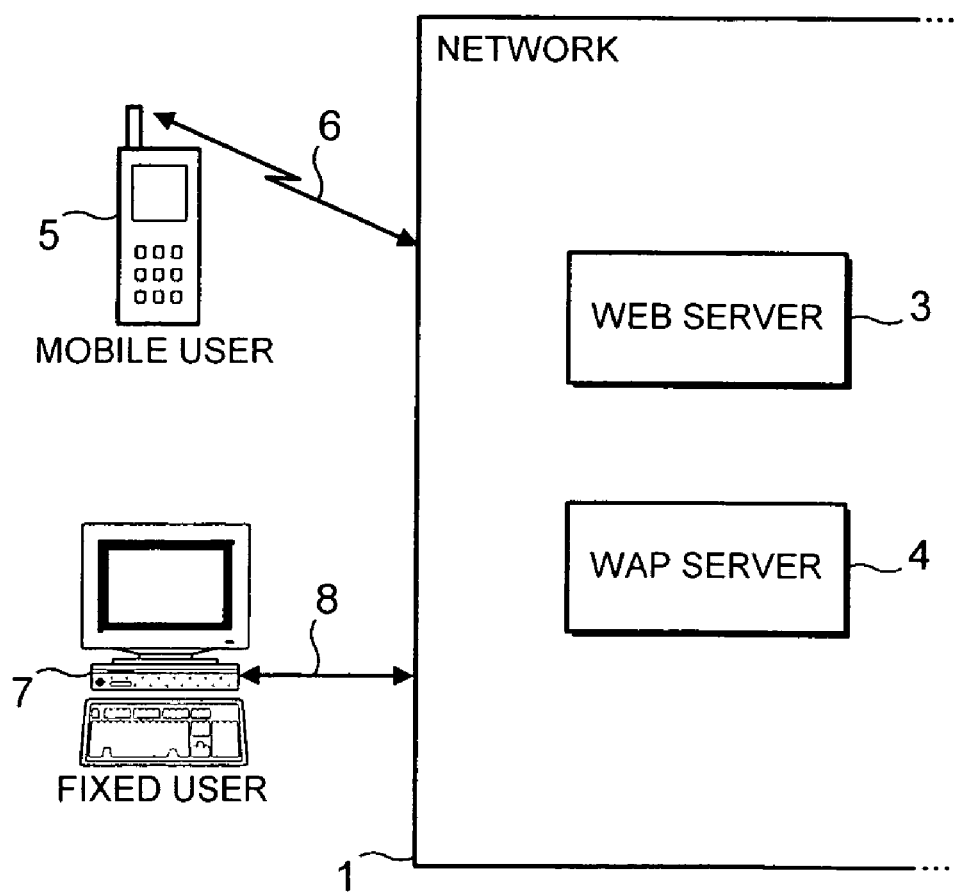
FIG. 1 is a schematic diagram illustrating access to a network.

Referring to FIG. 1, a network 1 is illustrated in which a web server 3 and a WAP server 4 are located. A particular example of the network 1 would be the internet, in which many such servers are provided for access by users. The connections within the network 1 are not shown in FIG. 1 for the sake of clarity but it will be appreciated that communication to and from the servers 3 and 4 may be directly initiated from the user, or may be routed through various network links. 25 Since the particular connection to the servers is not of concern to the present invention, the connections are not shown. As is known, the network 1 can be accessed by users. Two such users are illustrated in FIG. 1. The first is a mobile user 5 which communicates with the network 1 via an RF communications link 6. The second user shown in FIG. 1 is a fixed user 7 who communicates with the network over a fixed line access 8. Typically, the mobile user would access the network using a mobile telephone, a 35 personal digital assistant, or laptop computer provided with RF communications equipment. The fixed user 7 would typically use a personal computer (PC) to access the network 1.

As described above, recent standardization of the wireless application protocol (WAP) means that specific servers and locations can be provided for access by users.

As is known, each of the servers, and indeed each of the individual pages of information provided by the servers, have individual location addresses in the network. In order to access the information or application stored on a server, the user makes use of a browser application. The location address, for example URL, is supplied to the browser which accesses the network location indicated by the address. It will be appreciated that many of the location addresses can be complex, and not ideally suited to direct manual user input.

Accordingly, in an embodiment of the present invention, the user terminal (such as the mobile user 5 or the fixed user 7) defines a plurality of address components. Respective combinations of the address components form individual location addresses for accessing the network. In order to access a location address, the user can then simply specify a combination of address components. In an embodiment of the present invention, reference voice signals (or voice marks) are stored by the user and are associated with respective address components. The reference voice signals can therefore be short and convenient labels for the address components. For example, the voice signal "web" could be associated with the address component "http://www.", and the reference signal "home" could be associated with the user's preferred home page, for example "Ericsson.com/home". Thus, speaking "web, home" to the device would result, in this example, to production of the address "http://www.Ericsson.com/home", and the browser application would access that location on the network.

In this way, the user terminal need only compare input voice signals with the reference voice signals rather than performing full automatic speech recognition, in order to determine the location address.

Figure 2:
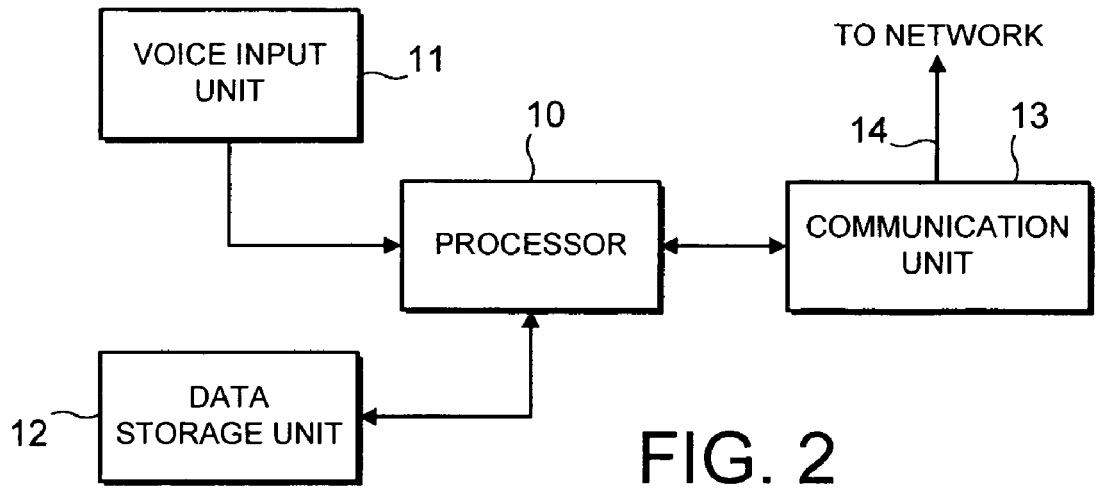
FIG. 2 illustrates parts of a device for accessing the network of FIG. 1.

FIG. 2 illustrates the components of the user terminal for operation in accordance with the present invention. The terminal includes a processor 10, for carrying out the various data processing requirements of the device, and also includes a voice input unit 11, a data storage unit 12 and a communications unit 13. The voice input unit receives input voice signals from a user of the device and converts those signals into data for use by the processor 10. When the system is being set up or updated, the processor 10 stores the input voice signals and reference voice signals in the data storage unit 12. The processor then associates the reference voice signals with stored address components, for example storing the associations in a look-up table.

When the user wishes to access the network, he or she inputs a voice signal, via the voice input unit 11, to the processor 10. The processor 10 compares the input voice signal with the reference voice signals stored in the data storage unit 12, to determine which of the reference voice signals match the input voice signals. The address components associated with the matched voice signals are retrieved from the storage unit 12, and are combined. The location address defined by the combination of address components is provided by the processor to the communications unit 13 for supply to the network 1 via a communications link 14. It will be appreciated that the communications link 14 may be an RF link in the case of a mobile user or a fixed link in the case of a fixed user.

Figure 3:
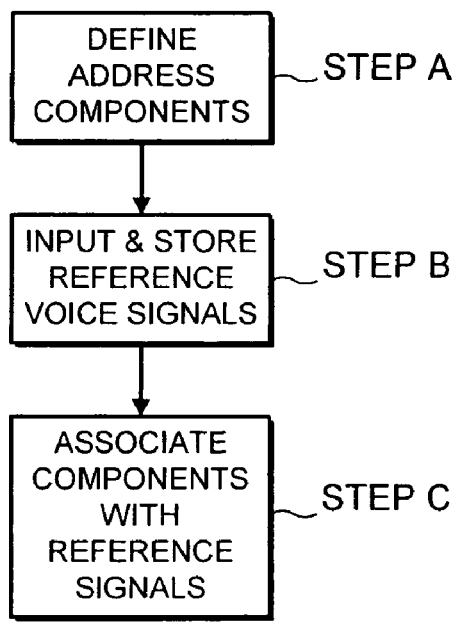
FIG. 3 illustrates initial steps in a method embodying the present invention.

FIG. 3 is a flow diagram illustrating steps in an initial or updating routine in a method according to the present invention. At step A, the user (or the system) defines the address components that will be used in combination to compose location addresses. For example, the user may choose those components most suited to their use, or the system may select the most commonly used components. At step B, the user inputs and stores reference voice signals, or "voice marks", and at step C, the stored reference voice signals are associated with the address components defined in step A. The result of the method of FIG. 3 is to produce a list of address components with their associated reference voice signals.

Figure 4:
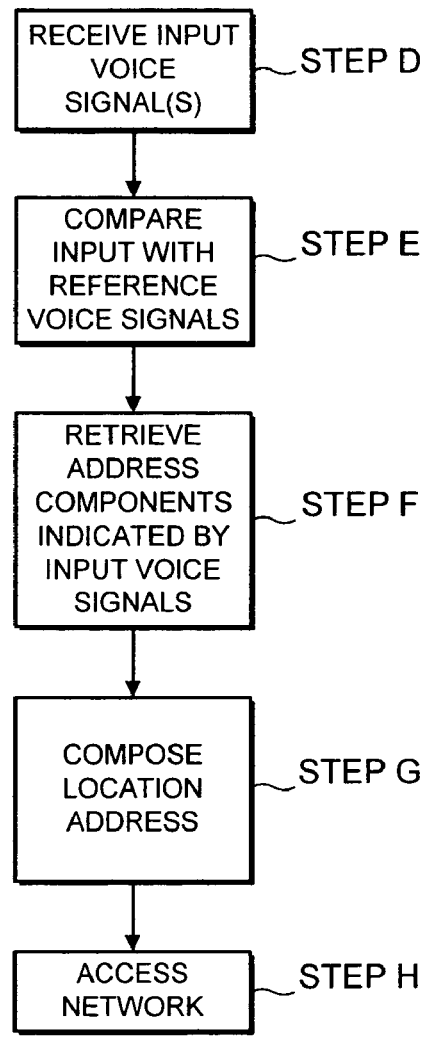
FIG. 4 illustrates further steps in a method embodying the present invention.

Operation of the system to access a location at a network will now be described with reference to FIG. 4. The user terminal receives input voice signals (step D) and then compares those input signals with the stored reference voice signals (step E). The comparison of reference voice signals with the input voice signals will produce an indication of which reference voice signals match the input voice signals. From this indication, the address components indicated by the input voice signals can be retrieved from the data storage unit 12 (FIG. 2) for further processing (step F). When the address components have been retrieved, the location address to be accessed by the user can be composed (step G), and the network accessed (step H).

It will be readily appreciated that storing a plurality of address components with their associated references enables the overall amount of stored data to be reduced. This is because several of the individual components may be repeated in different addresses. For example the heading "http://www." is a very common component of locations on the internet. This component therefore needs only to be stored once for use in many different location addresses.

Figure 5:
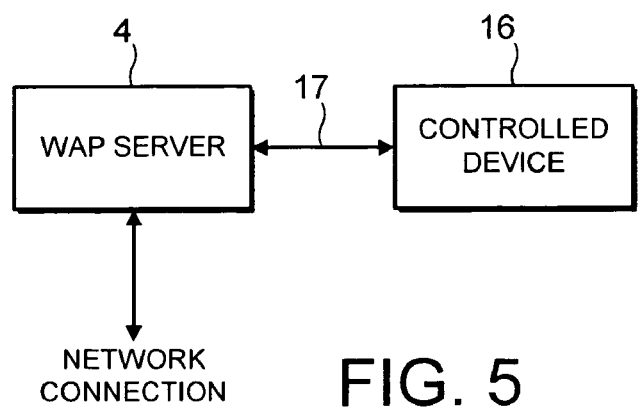
FIG. 5 illustrates a device controlled by a server of the network of FIG. 1.

A particularly useful application of the present invention is for use in controlling devices, such as televisions, and other equipment, via a network location. For example, in FIG. 5, the WAP server 4 of the network 1 of FIG. 1 is shown connected via a controlled connection 17 to a control device 16. The control connection 17 can be provided by a fixed link such as a parallel port cale connection, or by a wireless connection such as the Bluetooth™ protocol. The example of FIG. 5 shows a WAP server, but it is to be appreciated that the server can be any type of network server suitable for such an application. In order to control the control device 16, the user accesses the WAP server location using the browser in accordance with the present invention to provide commands for the WAP server to control the device 16. The particular location address supplied to the WAP server by the user terminal can issue the relevant controls to the control device 16. Since many of the controls for the control device are likely to be common commands, each of these can be provided with an associated reference voice signal. All it is then necessary for a user to control a control device 16 via the server 4 is to speak voice control relating to the reference voice signals to the access device. This particular system is best described by reference to a particular example, as below.

For example, controlling household devices such as a television, a video and a lamp would require the user to define reference voice signals for the control of those devices. The voice signal "control" could provide the address component relating to the initial part of the WAP server address ("wapaddress:"), "TV" can define the address of the television on the WAP server, and "channel" to the computer "cgi?. channel=". In addition, some generic components such as "ON" (="on."), "OFF" (="off.") and numbers 0 to 9 can be defined. Thus, to turn on the television to channel 3, the user need only speak "control TV ON channel 3", rather than "wapdevice://TVaddress/on.cgi?channel=3". It would be preferable for the user terminal to retain the last controlled device parameters (i.e. TV in the example) such that other controls can be shortcut further, so that changing the volume on the television would simply be a question of saying "volume up" or "volume down". These last voice inputs would then result in the addresses "wapdevice://TVaddress/cgi?volume=up" and "wapdevice://TVaddress/cgi?volume=down" respectively.

Building up the control language in the form of a location address for accessing a network in this way from address components having their own reference voice signals, means that common commands need only be control 1. For example the numbers 0 to 9, on, off etc are likely to be common to the control of many devices. Also, it has the distinct advantage that the user need only speak short catchwords rather than needing to remember the full control address.

An idea complementing the present invention is to add voice tags to wireless mark-up language documents. Thus voice files can be attached to a location such that feedback (for example OK, error etc) can be supplied to the user. This is particularly suited to those occasions when a display is small or not provided.

It will be appreciated that the mobile users connection to the network can be vis a mobile telephone network such a GSM or third generation GSM, or via a local RF communications system such as Bluetooth™. One advantage of the embodiment of the present invention is that standard communications protocols, such as Internet protocol, Wireless Application Protocol (WAP) or Bluetooth™ (standard communication protocol), can be used to control devices via a network server using standard access techniques. The voice activation of the access is enabled by the use of voicemarks. In the case of a mobile device accessing WAP pages, the device can provide the usual WAP page output to feedback to the user.

The present invention is particularly useful when a user is using a headset and does not have access to a keyboard. For example, a user may use a hands-free headset with a mobile telephone. In that case the user does not have direct access to the keypad of the mobile telephone. The present invention then allows the user to access web pages and to control devices without reference to the keypad. Voice feedback from the page or device concerned removes the need for access to a display device.

A further development of the invention enables complete complex URLs to be assigned voice bookmarks. One drawback of associating complex URLs with voice bookmarks is that the URL can be complex to input initially.

For example. A URL used to control a garage door may have CGI calls with complicated parameters, e.g. Http://myGarage/openPort.cgi?open=1&user=arne.

Accordingly, a new object type "vVoiceURL" that is stored in the WAP server in the remote device is introduced. The format of the vVoiceURL object is:

| | |
|---|---|
| BEGIN: | vVoiceURL |
| URL: | Http: //myGarage/openPort.cgi?open=1&user=arne. |
| END: | vVoiceURL |

In a WAP page in the remote device (e.g. the garage WAP server) there is a link to this object:

| | |
|---|---|
| Configuration | |
| Add Bookmark | This is a link to a vVoiceURL object. |

When the user selects the link to the vvoiceURL object (i.e. the remote device action), the browser in the user's device will download the object and see that it is a vVoiceURL object. The user's device will then start its voice recognition training and let the user speak a phrase into the phone. Once the user is satisfied with the phrase, the bookmark is saved (with URL Http://myGarage/openPort.cgi?open=1&user=arne) and the voice tag is associated with the newly created bookmark.

Accordingly, the user is prompted to create a voice tag for a complex URL, without the need for creating the URL itself. The creation of the URL is performed by the server.

What is claimed:

1. A method of communicating with a network having a plurality of locations, each of which has a location address on the network, the method comprising:
   defining a plurality of address components, respective combinations of which form location addresses, wherein each location address comprises a plurality of address components;
   storing reference voice signals;
   associating each stored reference voice signal with one respective address component;
   receiving input voice signals;
   comparing the input voice signals with the reference voice signals;
   composing a location address from the address components that are associated with those reference voice signals which match the received input voice signals; and
   communicating with the network on the basis of the composed location address.

2. A method as claimed in claim 1, wherein communication with the network takes place over a mobile telephone network.

3. A method as claimed in claim 1, wherein communication with the network takes place over a short range RF communications network.

4. A method as claimed in claim 3, wherein the short range RF communications network is a Bluetooth-enabled network.

5. A method as claimed in claim 1, wherein communicating with a network serves to control a device.

6. A method of communicating with a network having a plurality of locations, each of which has a location address on the network, the method comprising:
   receiving input voice signals;
   comparing the input voice signals with stored reference voice signals, each stored reference voice signal having one respective address component associated therewith;
   composing a location address from address components that are associated with those reference voice signals which match the received input voice signals, wherein each location address comprises a plurality of address components; and
   communicating with the network on the basis of the composed location address.

7. A method as claimed in claim 6, wherein communication with the network takes place over a mobile telephone network.

8. A method as claimed in claim 6, wherein communication with the network takes place over a short range RF communications network.

9. A method as claimed in claim 8, wherein the short range RF communications network is a Bluetooth-enabled network.

10. A method as claimed in claim 6, wherein communicating with a network serves to control a device.

11. A method of accessing a network using a network access application, the network having a plurality of locations which have respective location addresses in the network, the method including:
- defining a plurality of address components, combinations of which form respective location addresses, wherein each location address comprises a plurality of address components;
- assigning reference voice signals to the address components, wherein each reference voice signal is associated with one respective voice signal; and
- comparing input voice signals with the reference voice signals and producing a network access address location on the basis of address components associated with matched input and reference voice signals.

12. Apparatus for accessing locations on a network in which network locations have respective location addresses, the apparatus comprising:
- a voice input unit for receiving input voice signals to input voice data;
- a data storage unit;
- a processing unit operable to receive input voice data and to supply and retrieve data to and from the data storage unit; and
- a communications unit for communicating with a network,
- wherein the processing unit is operable to associate reference voice signals with location address components, wherein each reference voice signal is associated with one respective voice signal, and to compose a network access location address from components associated with reference voice signals that match input voice signals, wherein each location address comprises a plurality of address components.

13. Apparatus as claimed in claim 12, wherein the communications unit is operable to communicate with the network over a mobile telephone network.

14. Apparatus as claimed in claim 12, wherein the communication unit is operable to communicate with the network over a short range RF communications network.

15. Apparatus as claimed in claim 14, wherein the short range RF communications network is a Bluetooth-enabled network.

16. Apparatus as claimed in claim 12, wherein the communications unit is operable to control a device.

17. Apparatus as claimed in claim 12, wherein the composed location address indicates a wireless application protocol server.

18. Apparatus as claimed in claim 12, wherein the apparatus is included in a mobile telephone.

19. Apparatus as claimed in claim 12, wherein the apparatus is included in a WAP-enabled portable electronic device.

20. Apparatus as claimed in claim 12, wherein the apparatus is included in a portable electronic device.

21. Apparatus as claimed in claim 12, wherein the apparatus is included in a device for accessing network information.

* * * * *

UNITED STATES PATENT AND TRADEMARK OFFICE
CERTIFICATE OF CORRECTION

PATENT NO. : 7,062,297 B2  Page 1 of 1
APPLICATION NO. : 09/908630
DATED : June 13, 2006
INVENTOR(S) : Sten Minör et al.

It is certified that error appears in the above-identified patent and that said Letters Patent is hereby corrected as shown below:

Col. 1, line 4, change "THe" to -- The--

Col. 2, line 52, delete "25"

Col. 2, line 61, delete "35"

Signed and Sealed this

Nineteenth Day of December, 2006

JON W. DUDAS
*Director of the United States Patent and Trademark Office*